(12) United States Patent
Younce et al.

(10) Patent No.: US 9,020,365 B2
(45) Date of Patent: Apr. 28, 2015

(54) METHOD AND APPARATUS FOR COMPENSATING FOR POLARIZATION MODE DISPERSION (PMD)

(75) Inventors: Richard C. Younce, Yorkville, IL (US); Julia Y. Larikova, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 769 days.

(21) Appl. No.: 12/082,091

(22) Filed: Apr. 8, 2008

(65) Prior Publication Data
US 2009/0252497 A1 Oct. 8, 2009

(51) Int. Cl.
| | |
|---|---|
| *H04B 10/12* | (2006.01) |
| *H04B 10/00* | (2013.01) |
| *H04B 10/06* | (2006.01) |
| *H04B 10/2569* | (2013.01) |
| *H04B 10/61* | (2013.01) |
| *H04B 10/079* | (2013.01) |

(52) U.S. Cl.
CPC ........ *H04B 10/2569* (2013.01); *H04B 10/6162* (2013.01); *H04B 10/07953* (2013.01)

(58) Field of Classification Search
CPC ............. H04B 10/079; H04B 10/0795; H04B 10/07951; H04B 10/07953; H04B 10/07955; H04B 10/0775; H04B 10/60; H04B 10/61; H04B 10/616; H04B 10/6162; H04B 10/69; H04B 10/697; H04B 10/2569; H04J 14/02
See application file for complete search history.

(56) References Cited

U.S. PATENT DOCUMENTS

| | | | |
|---|---|---|---|
| 5,930,414 A * | 7/1999 | Fishman et al. ................ | 385/11 |
| 6,271,952 B1 * | 8/2001 | Epworth ....................... | 398/147 |
| 6,583,903 B1 * | 6/2003 | Way et al. ...................... | 398/152 |
| 6,678,431 B2 * | 1/2004 | Han et al. ........................ | 385/11 |
| 7,016,567 B2 * | 3/2006 | Smith et al. ..................... | 385/37 |
| 7,156,567 B2 | 1/2007 | McLoone et al. | |
| 8,374,510 B2 | 2/2013 | Larikova et al. | |
| 2002/0122220 A1 * | 9/2002 | Robinson et al. ............. | 359/110 |
| 2002/0171888 A1 | 11/2002 | Mclaragni | |
| 2002/0186435 A1 * | 12/2002 | Shpantzer et al. ............ | 359/136 |
| 2002/0191903 A1 | 12/2002 | Neuhauser | |
| 2004/0131363 A1 * | 7/2004 | Kisaka et al. ................. | 398/152 |
| 2004/0213500 A1 * | 10/2004 | Zeng et al. ...................... | 385/11 |
| 2006/0146926 A1 | 7/2006 | Bhoja et al. | |
| 2006/0274320 A1 | 12/2006 | Caplan | |
| 2007/0110451 A1 | 5/2007 | Rasmussen et al. | |
| 2009/0190930 A1 | 7/2009 | Von Der Weid | |
| 2009/0285585 A1 | 11/2009 | Larikova et al. | |

OTHER PUBLICATIONS

Sunnerud, et al., "A Comparison Between Different PMD Compensation Techniques," *Journal of Lightwave Technology*, vol. 20, No. 3, pp. 368-378 (Mar. 2002).
Non-Final Office Action dated May 9, 2011 from U.S. Appl. No. 12/221,697.
Non-Final Office Action dated Oct. 26, 2011 from U.S. Appl. No. 12/221,697.
Notice of Allowance dated Jun. 25, 2012 from U.S. Appl. No. 12/221,697.
Notice of Allowance dated Oct. 10, 2012 from U.S. Appl. No. 12/221,697.

* cited by examiner

*Primary Examiner* — Darren E Wolf
(74) *Attorney, Agent, or Firm* — Hamilton, Brook, Smith & Reynolds, P.C.

(57) ABSTRACT

Current optical networks are engineered to handle amplifier noise and chromatic dispersion. Polarization mode dispersion occurs in optical networks due splitting of the light energy of a pulse propagating in a fiber into two modes. Compensating for polarization mode dispersion is a difficult and expensive task and hence only few commercial systems have been deployed to deal with this issue. A polarization mode dispersion compensation module according to an example embodiment of the present invention compensates for polarization mode dispersion by determining a performance metric related to an error rate of an optical signal in at least one polarization mode in a filtered state. Based on the performance metric, a control vector is determined to control the optical signal in the at least one polarization mode in the filtered state. The control vector is then applied to a polarization effecting device to compensate for polarization mode dispersion.

34 Claims, 7 Drawing Sheets

METHOD AND APPARATUS FOR COMPENSATING FOR POLARIZATION MODE DISPERSION (PMD)

BACKGROUND

Current optical networks are engineered to handle amplifier noise and chromatic dispersion. Polarization Mode Dispersion (PMD) is a phenomenon that occurs due to splitting of energy of an optical pulse propagating in a fiber into two polarization modes. Since these two modes have slightly different refractive indices, the two modes travel at different velocities and thus, PMD results in pulse spreading. PMD compensation (PMDC) is a difficult and expensive task and, hence, fiber links with high PMD coefficients are largely avoided for high speed transmission. However, if there are no other available options for dealing with PMD than to use a high PMD link, the operator has to pay a high price for deploying costly regenerators designed to zero out the dispersion.

Due to the difficulty and high cost associated with PMDC, only a few commercial systems have been deployed. Ten Gigabit per seconds (10 Gbps) transmission is fairly tolerant to PMD because of its long, 100 picoseconds (ps), symbol period. A general rule of thumb in optical network engineering is that having a PMD level up to a third of the symbol period can be tolerated. A third of the symbol period for a 10 Gbps transmission translates to having the symbol period set at 33 ps. Hence, network operators engineer their networks to keep the PMD below this level.

Higher rate channels are making their way into networks initially designed for 10 Gbps. These higher rate services of 40 Gbps and someday 100 Gbps have shorter signaling periods and, as such, are much more susceptible to PMD. For this reason and also to solve the problem of lower rates, such as 10 Gbps, on a high PMD fiber, there is a need to compensate for PMD.

SUMMARY

A method or corresponding apparatus in an example embodiment of the present invention compensates for polarization mode dispersion by determining a performance metric related to bit error rate of an optical signal in at least one polarization mode in a filtered state. Based on the performance metric, a control vector is determined to control the optical signal in the at least one polarization mode in the filtered state. The control vector is then applied to a polarization effecting device to compensate for polarization mode dispersion.

Another example embodiment of the present invention compensates for polarization mode dispersion by determining a performance metric related to a bit error rate of an optical signal. If the performance metric is below a threshold, a control vector is determined to control polarization mode of an optical signal based on optical signal power. Based on the performance metric, the control vector is then applied to a polarization effecting device to compensate for polarization mode dispersion.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An example embodiment of the present invention relates to compensating for Polarization Mode Dispersion (PMD).

PMD arises because an optical signal on a fiber exists in two polarization modes such that the modulated bit stream exists on two separate electromagnetic waves that are orthogonal to each other. The two polarization modes are identical at the beginning of the path. However, after some distance and depending on the symmetry of the fiber, the two modes begin to shift in time, which manifest itself as a pulse broadening effect. The pulse broadening effect of dispersion causes signals in adjacent bit periods to overlap, a phenomenon referred to as inter-symbol interference (ISI). In other words, one mode travels at a slightly faster speed than the other, so the two modes begin to shift in time with respect to each other.

In the receiver, both modes are mixed together as the optical signal is converted to an electrical signal. The shift between polarization modes creates a smeared electrical signal. In cases where the shift between polarization modes is severe, this shift may create multiple images of the signal.

The above phenomenon is referred to as first order PMD or Differential Group Delay (DGD). There are other higher orders of PMD that cause further undesirable effects, but receiver impairments are dominated by differential group delay.

PMD Compensation (PMDC) technology attempts to correct for the time shift between the modes. It has been the subject of much research and some product development, but little of it has made its way to commercial use due to its complexity and expense.

An example embodiment of the present invention relates to compensating for undesirable effects due to first order PMD or differential group delay. The example embodiment may control the effective differential group delay to less than half of a symbol period in order to compensate for PMD.

Figure 1:
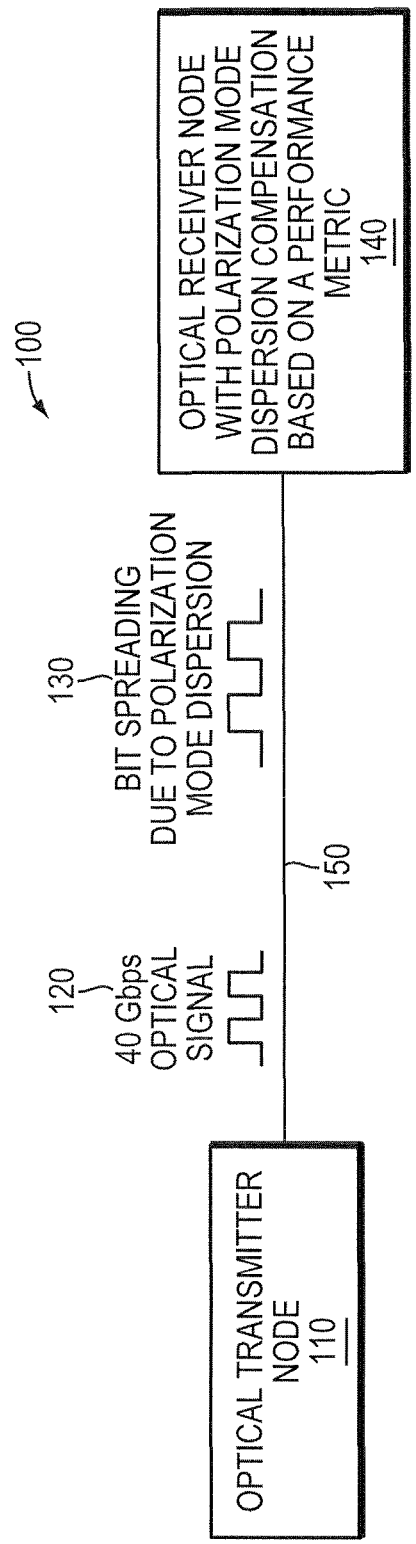
FIG. 1 illustrates an example of an optical communication network with a receiver that employs a polarization mode dispersion compensation module according to an example embodiment of the present invention.

FIG. 1 illustrates an example of an optical communications network 100 with a receiver 140 that employs a polarization mode dispersion compensation module (not shown) according to an example embodiment of the present invention. In this example embodiment, an optical transmitter node 110 transmits a 40 Gbps optical signal 120 through a transmission path, which includes a fiber 150. The optical signal 120 propagates through such fibers 150 in different modes, with each mode traveling at a slightly different velocity. This difference in the propagation of the optical signal 120 results in pulse spreading 130 due to PMD.

In addition to the fiber, PMD can be caused by individual components in the optical communications network 100. Additionally, factors such as mechanical stress due to movement of the fiber may result in PMD. For example, PMD may be caused by daily or seasonal temperature changes that result in cooling or heating of the optical fibers. PMD may be caused by vibrations in the fiber from nearby elements. For instance, vibrations arising from highways, railroad tracks, and fans in a central office, located near optical fibers, may result in PMD in the optical fibers.

In order to compensate for the PMD in the optical fiber, the optical communications network 100 employs the receiver 140 with the polarization mode dispersion compensation module according to an example embodiment of the invention.

The PMD compensation module employs measurements of the optical receiver 140 performance to determine a performance metric based on an error rate, such as a bit error rate, of the optical signal 120. The optical receiver 140 then uses this determined performance metric to compensate for the PMD dispersion.

In accordance with the foregoing, a method or corresponding apparatus in an example embodiment of the present invention compensates for polarization mode dispersion by determining a performance metric related to error rate, such as bit error rate, of an optical signal in at least one polarization mode in a filtered state. Based on the performance metric, a control vector is determined to control the optical signal in the at least one polarization mode in the filtered state. The control vector is then applied to a polarization effecting device to compensate for polarization mode dispersion.

Another example embodiment of the present invention compensates for polarization mode dispersion by determining a performance metric related to error rate of an optical signal. If the performance metric is below a threshold, a control vector is determined to control polarization mode of an optical signal based on optical signal power. Based on the performance metric, the control vector is then applied to a polarization effecting device to compensate for polarization mode dispersion.

Yet another example embodiment of the present invention includes a computer program product including a computer readable medium having computer readable code stored thereon, which, when executed by a processor, causes the processor to determine a performance metric related to an error rate of an optical signal in at least one polarization mode in a filtered state. Based on the performance metric, a control vector is determined to control the optical signal in the at least one polarization mode in the filtered state. The control vector is then applied to a polarization effecting device to compensate for polarization mode dispersion.

In the view of the foregoing, the following description illustrates example embodiments and features that may be incorporated into a system for compensation of PMD, where the term "system" may be interpreted as a system, subsystem, device, apparatus, method, or any combination thereof.

The system may determine the control vector based on the performance metric and optical power of the optical signal of the at least one polarization mode in the filtered state. The system may determine the control vector based on a combination of optical powers, including optical power of the optical signal of the at least one polarization mode in the filtered state and of the optical signal of a different polarization mode in an unfiltered state. The system may determine the control vector based on the power of the at least one filtered polarization mode during startup and following startup, determine the control vector based on the performance metric. The system may determine the control vector based on the power of the at least one filtered polarization mode if the performance metric falls below a first predetermined threshold, and following the performance metric rising above a second predetermined threshold, the system may determine the control vector based on the performance metric. The system may determine the control vector as a function of determining the control vector based on two polarization modes. The system may determine the control vector by applying dither control.

The system may determine the performance metric as a function of bit error rate. Additionally, the system may determine the performance metric as a function of at least one of the followings: eye opening, eye height, eye width, or Q-Factor. The system may determine a performance metric related to bit error rate of the optical signal in the least one filtered polarization mode to control polarization. The system may determine the bit error rate from a forward error correction function.

The system may compensate for polarization mode dispersion in a single mode fiber.

The system may control effective differential group delay in the single mode fiber to less than half of a symbol period.

The system may filter the optical signal to produce the optical signal in a filtered state in the at least one filtered polarization mode.

The system may perform polarization beam splitting of the optical signal to produce the optical signal in the at least one filtered polarization mode.

The optical signal to the system may be a received optical signal. The optical signal to the system may be a partially received optical signal.

The system may compensate for polarization mode dispersion using a stand alone polarization mode dispersion compensator.

Figure 2:
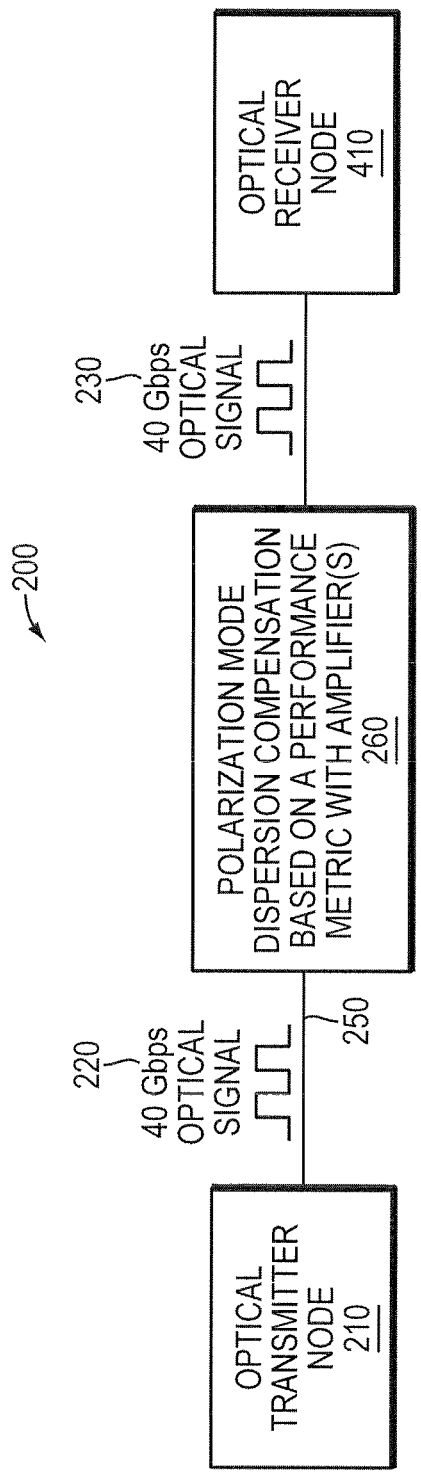
FIG. 2 illustrates an example of an optical communication network employing a polarization mode dispersion compensation module using an example embodiment of the present invention.

FIG. 2 illustrates an example of an optical communications network 200 employing a node 260 that provides polarization mode dispersion compensation module using an example embodiment of the present invention. In this example embodiment, the optical transmitter node 210 transmits a 40 Gbps optical signal 220 through a first transmission path 250*a*, which includes a fiber 250. The optical signal 220 propagates through the fiber 250 in different modes, each of which travels at a slightly different velocity. This difference in the propagation of the optical signal 220 results in pulse spreading 230 due to PMD.

In order to compensate for the PMD in the optical fiber, a polarization mode dispersion compensation module 260 according to an example embodiment of the present invention is employed. The PMD compensation module 260 employs a performance metric calculated based on the bit error rate of the optical signal 220 to compensate for PMD. The PMD compensation module may employ at least one amplifier (not shown) to amplify the light signal while performing PMD compensation, thus acting as a repeater in case losses are caused by optical elements (not shown) used to perform the PMD compensation.

After PMD compensation is complete, the optical signal with compensated PMD 230 is then transmitted to an optical receiver node 240.

Figure 3:
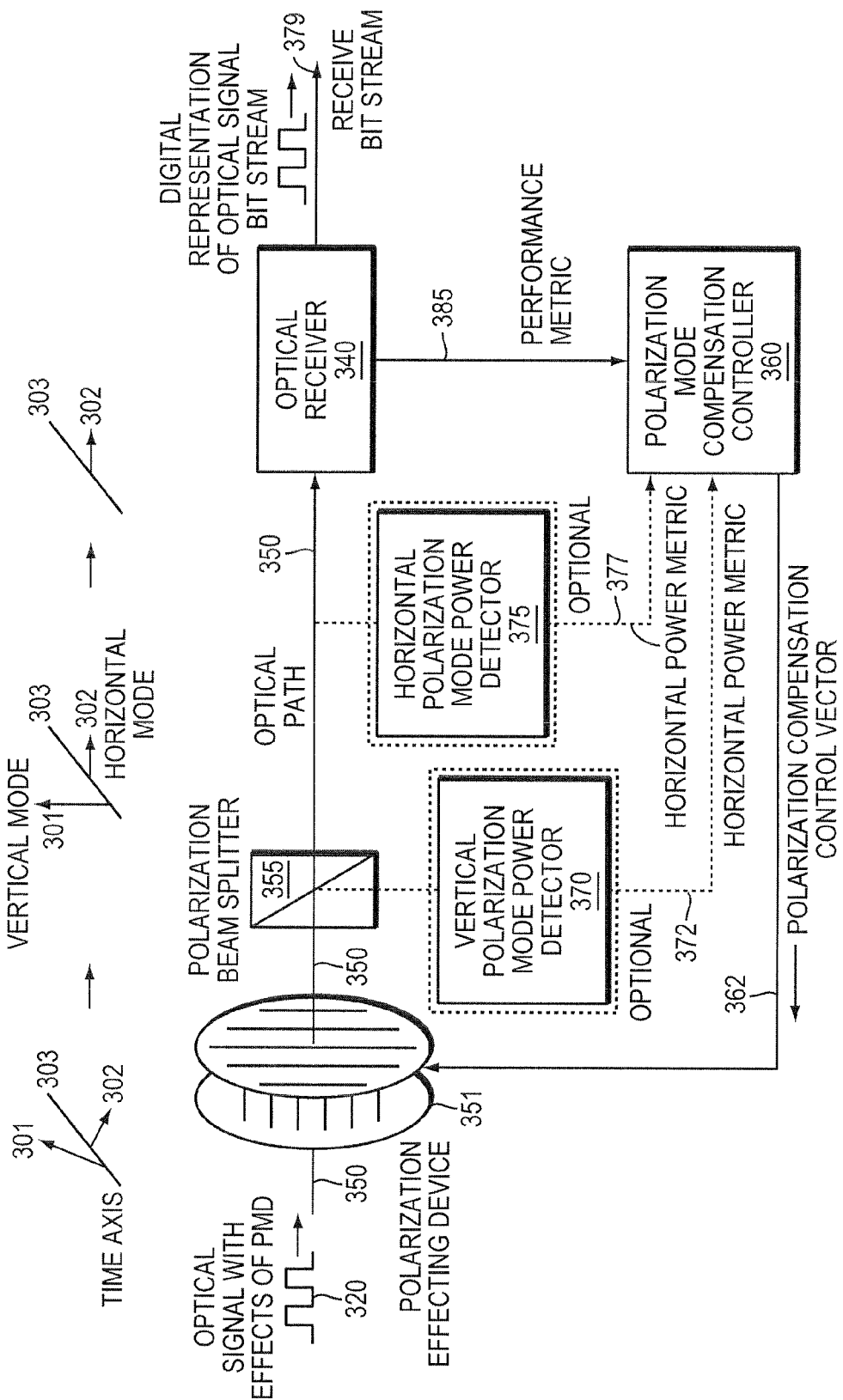
FIG. 3 illustrates an example embodiment of the present invention employing a polarization mode dispersion compensation module with a polarizer.

FIG. 3 illustrates an example embodiment 300 of the present invention employing polarization mode dispersion compensation with a polarization effecting device (PED) 351.

For illustration purposes, FIG. 3 only considers the case in which a single impulse of light, interchangeably referred to herein as optical signal 320, is transmitted down an optical path 350, e.g., optical fiber. The optical signal 320 propagates on the optical path 350 (i.e., an optical fiber) in two different polarization modes 301, 302 about a time axis 303, such that the modulated bit stream exists on two separate electro-magnetic waves that are orthogonal to each other. Due to the two different paths of propagation, the optical signal 320 is affected by polarization mode dispersion. At the top of FIG. 3, arrows represent these two polarization modes 301, 302 about the time axis 303 at various points in the example embodiment.

Initially, the two modes 301, 302 are split along the time axis 303 with the horizontal mode 302 delayed with respect to the vertical mode 301 about the time axis 303. Additionally, the two modes 301 and 302 always remain orthogonal to each other along the time axis 303.

A polarization effecting device 351 can rotate the polarization of the optical signal 320 under control of a polarization mode compensation controller 360 to any particular orientation. The controller 360 rotates the polarization of the optical signal 350 so that one of the polarization modes (e.g., horizontal mode 302) is aligned with the vertical polarizer inside of a polarization beam splitter 355 along an optical path 350 and the other (e.g., vertical mode 301) is aligned to the horizontal polarizer. In this example embodiment, a polarization beam splitter 355 separates the horizontal mode 302 and sends it to an optical receiver 340. Thus, the configuration of this example embodiment 300 does not employ a time shifter (not shown) to shift the vertical mode 301, nor does this example embodiment 300 recombine the horizontal and vertical modes 301, 302 to create a corrected signal. It should be understood that the polarization beam splitter 355 may alternatively be a filter or other optical element(s) used to separate the polarization modes as described herein.

The polarization effecting device 351 in this example embodiment may be used to maximize optical power entering the optical receiver 340. Unlike traditional polarization compensators, the polarization effecting device 351 of this example embodiment is not controlled based on polarization alignment with the polarization beam splitter 355, which simplifies control and reduces both costs and computational complexity.

Further, in this example embodiment, the controller's 360 controlling the polarization effecting device 351 may not be entirely based on a measurement of the optical receiver 380 performance but also based on measurements of optical power by an optional vertical polarization mode power detector 370 or a horizontal polarization mode power detector 375. Specifically, the receiver 380 determines a performance metric 385 based on an error rate, such as a bit error rate, of the optical signal 340.

The performance metric 385 may be determined as a function of at least one of the followings: eye opening, eye height, eye width, or Q-Factor. Eye opening, height, and width are factors relating to an "eye" diagram, which is a useful tool for analysis of the signal in digital communication. The eye diagram is essentially the oscilloscope display of the received optical signal, sampled repetitively and applied to the vertical input signal, resulting in a pattern resembling a series of "eyes". The eye diagram may be analyzed to measure the performance of the system. Eye opening, measure of height of an eye from peak to peak, is a parameter used for measuring the amount of additive noise in the signal. Similarly, eye width and eye height may be used as measures of distortion, synchronization, and jitter effects.

The polarization mode dispersion compensation of this example embodiment 300 then employs the performance metric 385 along with possible optical power metric measurements 372, 377, or possibly at least the horizontal polarization mode power metric 377, obtained from the input and output of the polarization beam splitter 355 to compensate for the dispersion.

The receiver 380 of this example embodiment may include modules (not shown), such as an optical front end, photo detectors, clock recovery module, decision circuit, and/or forward error correction module. When forward error correction is employed, the receiver employs arithmetic or algebraic structure of the optical signal to detect and correct possible errors in the signal. The receiver 340 generates the receive bit stream 399 based on the digital representation of the optical signal bit stream.

In one example embodiment, the control system 360 can maximize a difference between the horizontal power and the vertical power measures 372, 377 to ease the procedure of making differential power measurement.

In this example embodiment, two degrees of freedom are used to control the polarization effecting device 351, resulting in reduction of cost and simplified control. Although, theoretically, employing two degrees of freedom may not perform as well as configurations with higher degrees of freedom, this configuration 300 is cost effective, computationally feasible, and performs well enough to be used in many network applications.

The polarization controller 360 may employ available control system methods in the literature, such as a proportional integral derivative (PID) control or any form of digital control.

An example embodiment of the present invention may determine the control vector by applying dither control. Dither control is typically used in situations where the relationship between the control variables and the plant being controlled are unpredictable. The control variables are changed in small steps in random directions while plant performance is monitored. Future control decisions are biased along the directions that produced performance improvements in the past. Polarization control has a high degree of unpredictability and complexity that make dither control attractive for practical control applications.

Another example embodiment of the present invention may employ a fiber squeezer (not shown) to change physical dimension(s) of the optical path 350 to control the polarization in the optical path 350.

Yet another example embodiment of the present invention may determine the bit error rate from a forward error correction function.

Another example embodiment of this invention may determine the performance metric as a function of at least one of eye opening, eye height, eye width, or Q-Factor, where each of these performance metrics is a measure of an optical logical one to an optical logical zero, represented by photons in the optical signal 320 as determined by the optical receiver 380.

Yet another example embodiment of the present invention may determine a control vector based on the power of at least one of the polarization modes (e.g., horizontal) during startup. Following startup the example embodiment may determine the control vector 362 exclusively based on the performance metric.

Another example embodiment of the present invention may switch from using power measurements (i.e., power metric 372 or 377) to control the polarization effecting device 351 as follows. After a predetermined amount of time has passed (or a threshold has been crossed), the example embodiment may switch the control from power control to some other form of control based on receiver performance, to maximize some measure of receiver performance.

Yet another example embodiment of the present invention may employ measures of the bit error rate of the receiver using forward error correction and eye opening penalty in order to determine the performance metric.

Other example embodiments of the present invention may use measures such as signal-to-noise ratio. The measure may be calculated using linear or logarithmic calculations. Similarly, other factors may be calculated using linear or logarithmic calculations to determine the performance metric.

Another example embodiment of the present invention may employ a stand alone configuration of the polarization mode dispersion compensation. The stand alone polarization mode dispersion compensation configuration operates much like the example embodiment illustrated in FIG. 3 with the receiver 380 replaced with a partial receiver (not shown). The partial receiver contains circuitry needed to produce the performance measurement for control purposes and not full transceiver circuitry. Using a stand alone configuration may be lower cost when it is needed to zero out the polarization mode control on a dispersive path. Additionally, having a stand alone configuration may be more cost effective than having a full back-to-back transmitter-responder (transponder) used to receive, amplify, and retransmit the optical.

Another example embodiment of the present invention may be employed for non-return to zero applications. In non-return to zero applications, the pulse portion of the signal for a "1" bit occupies the entire bit interval, and no pulse is used for a "0" bit. The advantage having a non-return to zero application is in that the signal occupies a small bandwidth. An example embodiment of the present invention may be used for 40 Gbps non-return to zero optical transmission systems to improve the tolerance of the system to PMD.

Yet another example embodiment of the present invention may be employed for differential phase shift keying (DPSK) modulation format.

Figure 4:
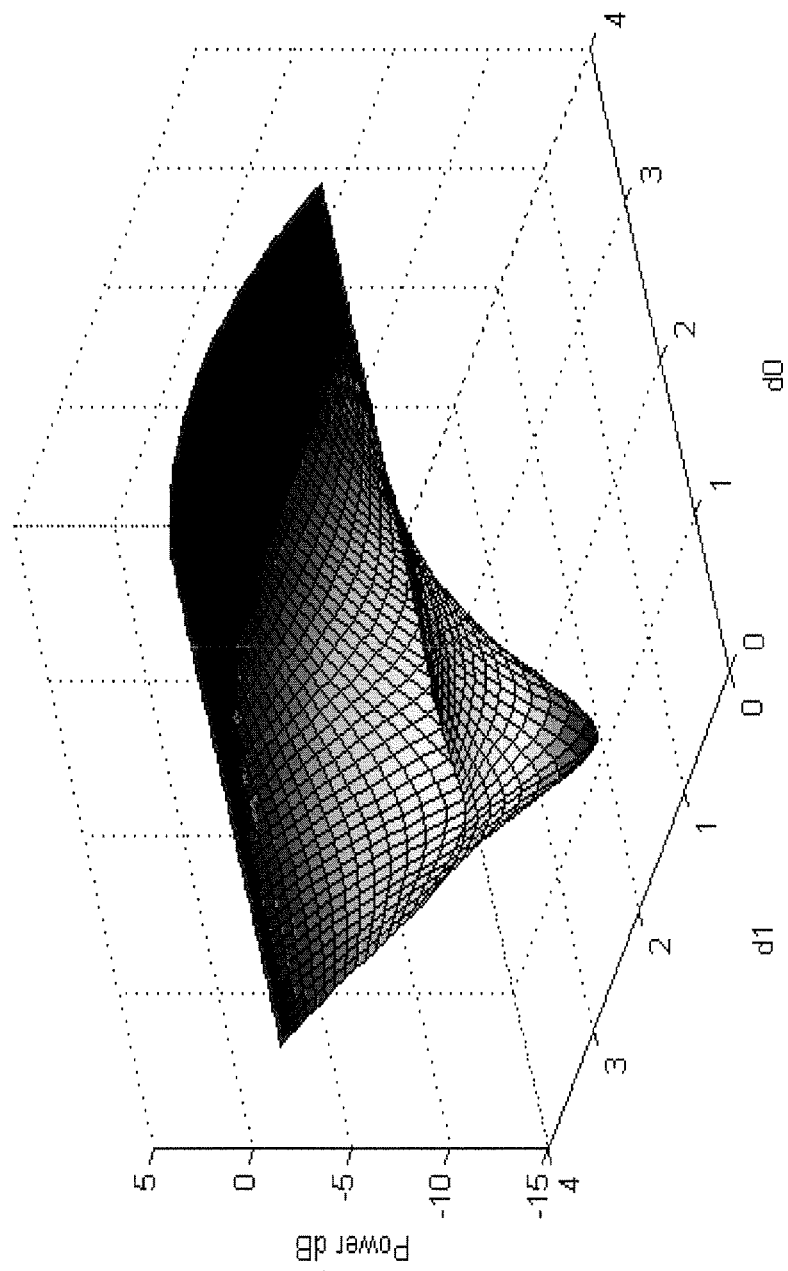
FIG. 4 is a plot of receive polarization power as a function of polarization controller degrees of freedom.

FIG. 4 is a plot of receive horizontal polarization power as a function of polarization controller's two degrees of freedom. This illustrates typical fiber behavior where the polarization power is a smooth function of the polarization effecting device 351 and has a single, global maximum. In this example, the power is maximized when the first degree ($d_0$) is controlled to $\pi$ and the second degree ($d_1$) is controlled to $\pi/2$.

Figure 5:
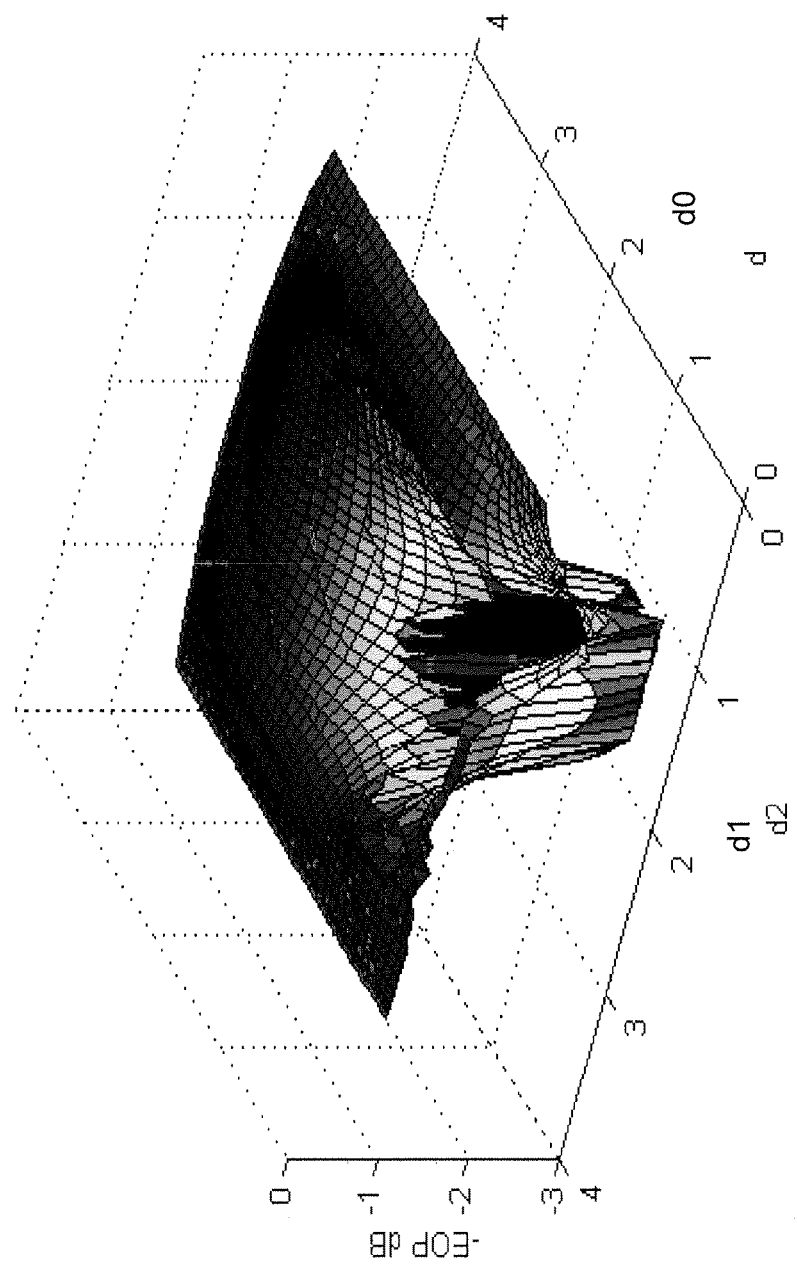
FIG. 5 is a plot of receive polarization performance as a function of polarization controller degrees of freedom.

FIG. 5 is a plot of receive polarization performance as a function of polarization controller degrees of freedom. This plot illustrates an example embodiment, in which eye opening penalty (in decibels, on the vertical axis) is used as the performance metric. This performance plot is more complex than the smooth power plot shown in FIG. 4. It illustrates typical fiber behavior where the presence of local maximums make finding the global maximum difficult. As illustrated in this plot, the performance of the system is maximized when $d_0$ takes values close to $\pi$ and $d_1$ takes values close to zero. Hence, the performance of this example embodiment improves as the value of eye opening approaches zero.

FIGS. 4 and 5 illustrate that performance is maximized at a different control operating point than where the power is maximized. Hence both measures may be used to control the polarization controller.

Figure 6:
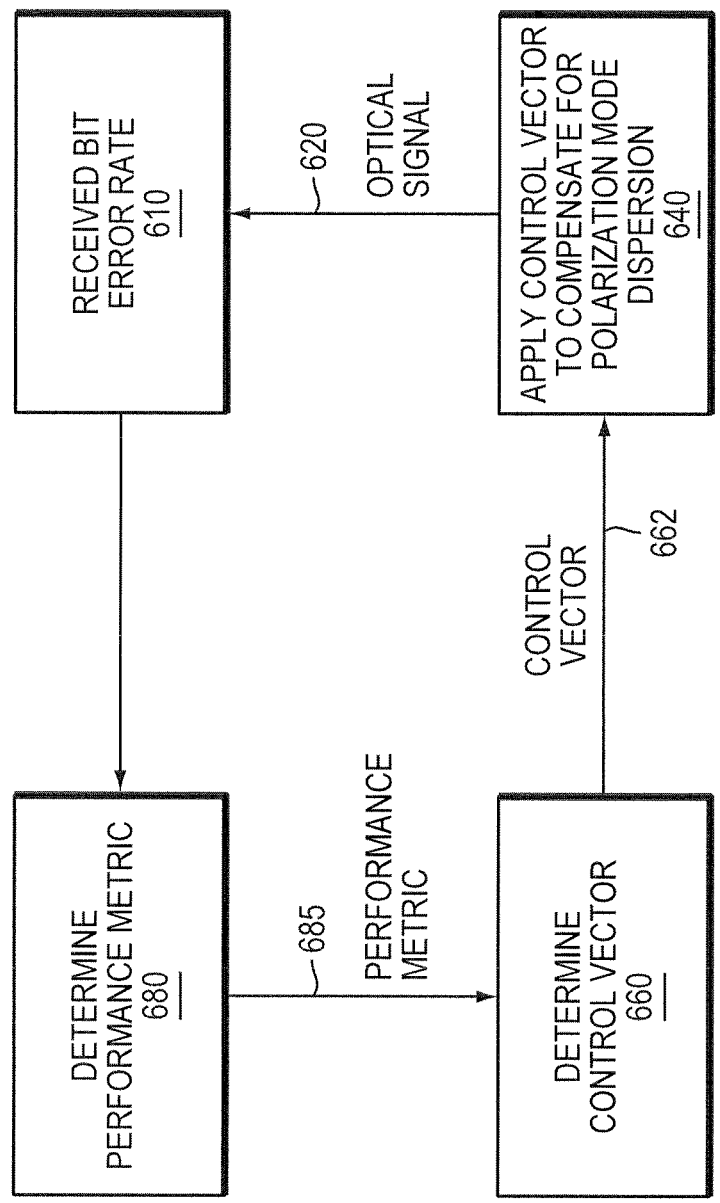
FIG. 6 is a flow diagram of an example embodiment of the polarization mode dispersion compensation module.

FIG. 6 is a flow diagram of an example embodiment 600 of the polarization mode dispersion compensation module. The example embodiment 600 compensates for polarization mode dispersion by determining the performance metric 685 in a module for determining the performance metric 680. The performance metric 685 is calculated as a function of received bit error rate 610 of an optical signal 620.

A module for determining the control vector 660 subsequently determines the control vector 660 as a function of the performance metric 685. The control vector 662 is then applied to a polarization effecting device to compensate for polarization mode dispersion 640.

Figure 7:
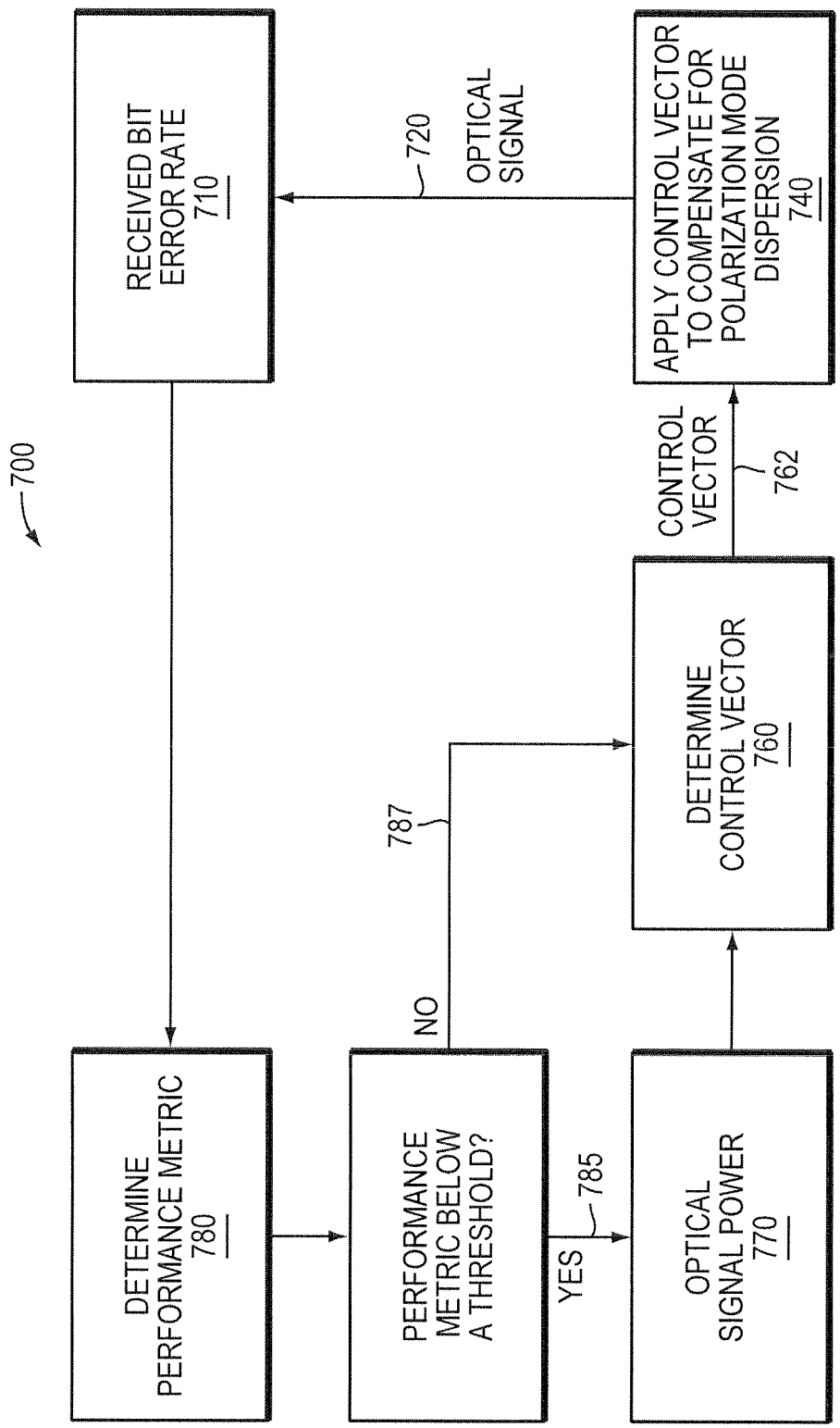
FIG. 7 is a flow diagram of an example embodiment of the present invention.

FIG. 7 is a flow diagram of an example embodiment 700 of the polarization mode dispersion compensation module. The example embodiment 700 compensates for polarization mode dispersion by determining the performance metric 785 in a module for determining the performance metric 780. The performance metric 785 is calculated as a function of received bit error rate 710 of an optical signal 720.

If the performance metric 785 is below a certain threshold, a module for determining the control vector 760 subsequently determines the control vector 760 as a function of the performance metric 785 and the optical signal power 770. The control vector 762 is then applied to a polarization effecting device to compensate for polarization mode dispersion 740.

While this invention has been particularly shown and described with references to example embodiments thereof, it will be understood by those skilled in the art that various changes in form and details may be made therein without departing from the scope of the invention encompassed by the appended claims.

What is claimed is:

1. A method for compensating for polarization mode dispersion comprising:
   determining an error rate, in an electrical domain, of an optical signal in at least one polarization mode in a filtered state;
   (i) determining a control vector to control the optical signal in the at least one polarization mode in the filtered state based on the error rate in an event the error rate is below a predetermined threshold and (ii) determining the control vector to control the optical signal in the at least one polarization mode in the filtered state based on the error rate and optical power of the optical signal in the at least one polarization mode in the filtered state in an event the error rate is above the predetermined threshold; and
   applying the control vector to a polarization effecting device to compensate for polarization mode dispersion.

2. The method of claim 1 further including determining the control vector based on a combination of optical powers, including optical power of the optical signal of the at least one polarization mode in the filtered state and of the optical signal of a different polarization mode.

3. The method of claim 1 further including determining the control vector based on the power of the at least one filtered polarization mode during startup and, following startup, determining the control vector based on the error rate.

4. The method of claim 1 wherein determining the control vector includes determining the control vector based on two polarization modes.

5. The method of claim 1 wherein determining the control vector includes applying dither control.

6. The method of claim 1 wherein determining the error rate includes determining a bit error rate.

7. The method of claim 6 further including determining the bit error rate as a function of at least one of the following: eye opening, eye height, eye width, or Q-Factor.

8. The method of claim 6 further including determining the bit error rate from a forward error correction function.

9. The method of claim 1 further including compensating for polarization mode dispersion in a single mode fiber.

10. The method of claim 9 further including controlling effective differential group delay in the single mode fiber to less than half of a symbol period.

11. The method of claim 1 further including filtering the optical signal to produce the optical signal in a filtered state in the at least one filtered polarization mode.

12. The method of claim 1 further including polarization beam splitting of the optical signal to produce the optical signal in the at least one filtered polarization mode.

13. The method of claim 1 wherein the optical signal is a received optical signal.

14. The method of claim 1 wherein the optical signal is a partially received optical signal.

15. The method of claim 1 further including compensating for polarization mode dispersion using a stand alone polarization mode dispersion compensator.

16. An apparatus for compensating for polarization mode dispersion comprising:
a first determination module to determine an error rate, in an electrical domain, of an optical signal in at least one polarization mode in a filtered state;
a second determination module to (i) determine a control vector to control polarization of the optical signal in the at least one polarization mode in the filtered state based on the error rate in an event the error rate is below a predetermined threshold and (ii) determine the control vector to control the optical signal in the at least one polarization mode in the filtered state based on the error rate and optical power in the at least one polarization mode in the filtered state in an event the error rate is above the predetermined threshold; and
an application module to apply the control vector to a polarization effecting device to compensate for polarization mode dispersion.

17. The apparatus of claim 16 wherein the second determination module is arranged to determine the control vector based on a combination of optical powers, including optical power of the optical signal of the at least one polarization mode in the filtered state and of the optical signal of a different polarization mode.

18. The apparatus of claim 16 wherein the second determination module is arranged to determine the control vector based on the power of the at least one filtered polarization mode during startup and, following startup, to determine the control vector based on the error rate.

19. The apparatus of claim 16 wherein the second determination module is arranged to determine the control vector based on two polarization modes.

20. The apparatus of claim 16 wherein the second determination module is arranged to determine the control vector by applying dither control.

21. The apparatus of claim 16 wherein the first determination module is arranged to determine a bit error rate as a function of at least one of the following: eye opening, eye height, eye width, or Q-Factor.

22. The apparatus of claim 16 wherein the first determination module is arranged to determine a bit error rate from a forward error correction function.

23. The apparatus of claim 16 further arranged to compensate for polarization mode dispersion in a single mode fiber.

24. The apparatus of claim 23 further including a control module to control effective differential group delay in the single mode fiber to less than half of a symbol period.

25. The apparatus of claim 16 further including a filtering module arranged to filter the optical signal to produce the optical signal in a filtered state in the at least one filtered polarization mode.

26. The apparatus of claim 16 further including a polarization beam splitting module arranged to beam split the optical signal to produce the optical signal in the at least one filtered polarization mode.

27. The apparatus of claim 16 wherein the optical signal is a received optical signal.

28. The apparatus of claim 16 wherein the optical signal is a partially received optical signal.

29. The apparatus of claim 16 further arranged to compensate for polarization mode dispersion using a stand alone polarization mode dispersion compensator.

30. A method for compensating for polarization mode dispersion comprising:
determining an error rate, in an electrical domain, of an optical signal;
(i) determining a control vector to control polarization mode of the optical signal based on the error rate in an event the error rate is below a predetermined threshold and (ii) determining the control vector to control polarization mode of the optical signal based on the error rate and optical signal power in an event the error rate is above the predetermined threshold; and
based on the error rate, applying the control vector to a polarization effecting device to compensate for polarization mode dispersion.

31. The method of claim 30 further including applying dither control to generate the control vector.

32. An apparatus for compensating for polarization mode dispersion comprising:
a first determination module to determine an error rate, in an electrical domain, of an optical signal;
a second determination module to (i) determine a control vector to control polarization mode of the optical signal based on error rate in an event the error rate is below a predetermined threshold and (ii) determine the control vector to control polarization mode of the optical signal based on the error rate and optical signal power in an event the error rate is above the predetermined threshold; and
based on the error rate, an application module to apply the control vector to a polarization effecting device to compensate for polarization mode dispersion.

33. The apparatus of claim 32 wherein the second determination module is arranged to determine control vector by applying dither control.

34. A computer program product comprising a non-transitory computer readable medium having computer readable code stored thereon, which, when executed by a processor, causes the processor to:
determine an error rate of an optical signal, in an electrical domain, in at least one polarization mode in a filtered state;
(i) determine a control vector to control the optical signal in the at least one polarization mode in the filtered state based on the error rate in an event the error rate is below a predetermined threshold and (ii) determine the control vector to control the optical signal in the at least one polarization mode in the filtered state based on the error rate and optical power of the optical signal in the at least one polarization mode in the filtered state in an event the error rate is above the predetermined threshold; and
apply the control vector to a polarization effecting device to compensate for polarization mode dispersion.

* * * * *